United States Patent
Schwarzrock

[11] 3,799,725
[45] Mar. 26, 1974

[54] SEAL FOR A HORIZONTALLY DISPOSED BLOW MOLDING APPARATUS

[75] Inventor: Karl Schwarzrock, Lohmar, Germany

[73] Assignee: Dynamit Nobel Aktiengesellschaft, Troisdorf, Germany

[22] Filed: Nov. 4, 1971

[21] Appl. No.: 195,597

[30] Foreign Application Priority Data
Nov. 30, 1970 Germany............................ 2058760

[52] U.S. Cl............. 425/326 B, 285/13, 425/381.2, 425/DIG. 51
[51] Int. Cl............................................... B29f 3/00
[58] Field of Search............ 425/247, 381.2, 382 N, 425/425, 433, 435, DIG. 51, 326 B; 285/13, 14, 272, 275, 110

[56] References Cited
UNITED STATES PATENTS

| | | | |
|---|---|---|---|
| 2,509,091 | 5/1950 | Faccou | 285/110 |
| 2,649,105 | 8/1953 | Stout et al. | 285/110 X |
| 3,171,675 | 3/1965 | Calciano | 285/110 |
| 3,349,434 | 10/1967 | Hureau | 425/382 N UX |
| 3,584,900 | 6/1971 | Lennon | 285/14 |

Primary Examiner—Richard B. Lazarus
Attorney, Agent, or Firm—Craig and Antonelli

[57] ABSTRACT

A horizontally disposed blow molding apparatus having an oscillating or rotating portion, a fixed portion and a seal disposed between the portions. The seal includes a bushing of spring steel with unilaterally formed, razor-sharp lips positioned in the fixed part and a bushing of bearing bronze located in the rotating part. The seal is preferably arranged in the zone of the axial material inlet to the blow molding apparatus. Advantageously, the steel spring bushing includes an annular groove in communication with a discharge pipe.

14 Claims, 1 Drawing Figure

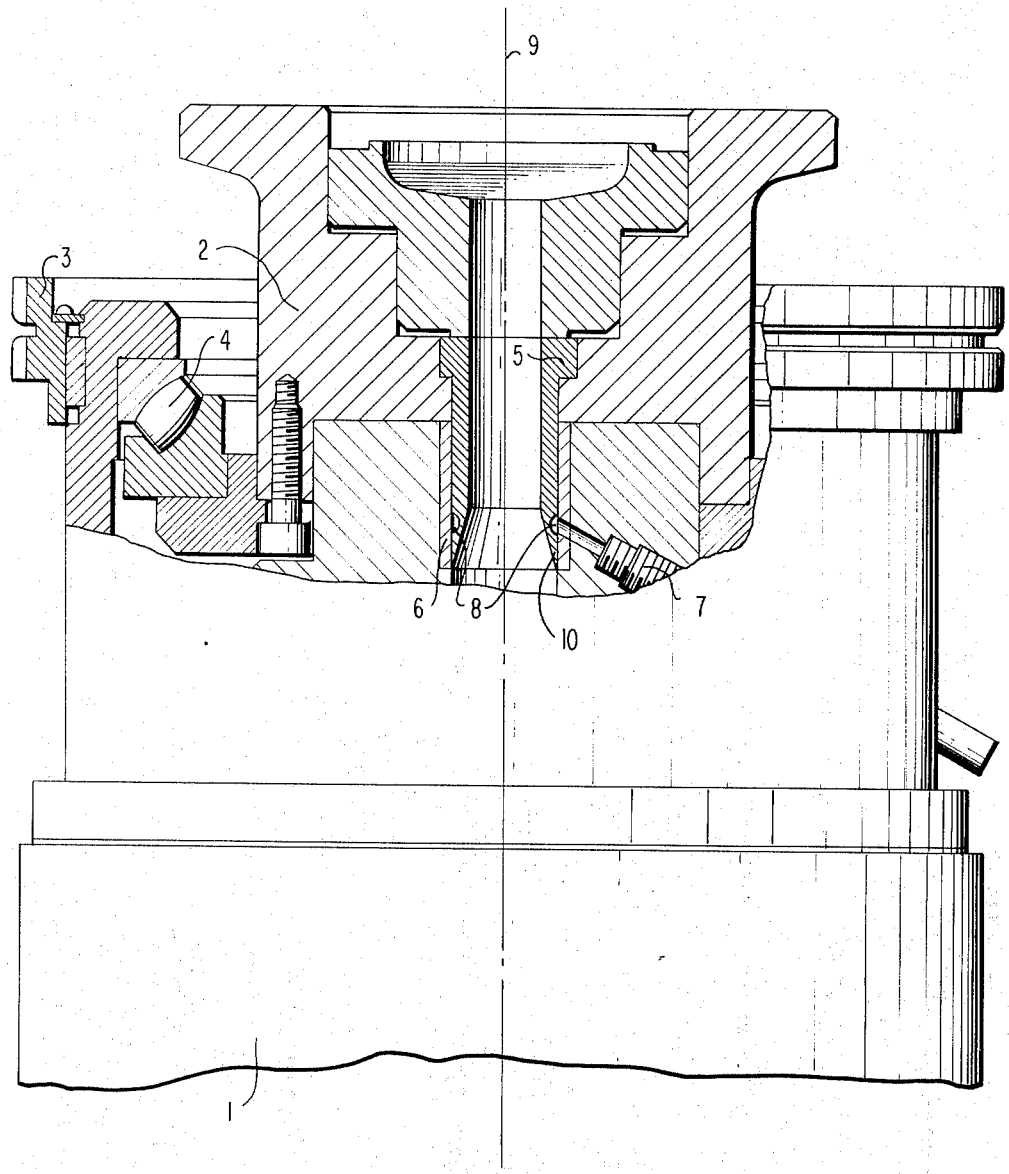
INVENTOR
KARL SCHWARZROCK

SEAL FOR A HORIZONTALLY DISPOSED BLOW MOLDING APPARATUS

BACKGROUND OF THE INVENTION

In order to avoid humps on coils or rolls of film, so-called barrel hoops, in the manufacture of blown films, which humps are produced by the summation of local thickness tolerances, the rotation or oscillation windup device, the blowing head (die), or the entire extruder, has been employed to effect a uniform distribution of thickness differences over the width of the coil.

In all these conventional processes, the mode of operation or extension of the film tube, is vertically upward or downward. Typically, the vertical mode of operation utilizes a horizontal extruder cylinder (only smaller machines are occasionally built with a vertical cylinder as single-purpose extruders) requiring a deflection of the plastic mass before or within the blowing die from the horizontal into the vertical orientation. Experience has shown that such deflections result in fluctuating flow rates which can result in damage, especially in case of thermally sensitive synthetic resins, such as, for example, hard PVC and PvdC (polyvinyl dichloride). One possible solution is the use of blowing dies, exhibiting a horizontal mode of operation, which rotate or oscillate, for example about 360°. Unfortunately this solution has not been heretofore feasible due to a sealing problem, the solution of which was difficult.

SUMMARY OF THE INVENTION

The present invention solves the disadvantages of the prior art by providing a molding apparatus with an oscillating part and a fixed or stationary part for the production of tubular films of thermoplastic compoisitions by the blowing method in a horizontal mode of operation, which apparatus is characterized in that a seal is formed between the oscillating part and the fixed part in the zone of the axial feed for the material, by means of a bushing, preferably of spring steel, disposed in the fixed part, which bushing exhibits unilaterally provided, razor sharp lips, and a bushing, preferably of bearing bronze, disposed in the rotating part.

The oscillation, i.e. the variation in the direction of rotation, can be effected, for example, after 180°, 360°, or several times 360°.

Suitably, the spring steel bushing has an annular groove in communication with a discharge pipe.

BRIEF DESCRIPTION OF THE DRAWING

Various other features and advantages will be apparent from the following detailed description of the invention and the attendant drawing which illustrates one embodiment thereof.

DETAILED DESCRIPTION OF THE INVENTION

In a horizontal blowing die with a symmetrical axial material feed inlet 9, the front section 1 is rotatably movable with respect to the section 2 (flanged to the extruder in a conventional manner), via a drive wheel or gear 3 and a self-aligning, radial roller bearing 4. Axial guidance and simultaneous sealing of both die sections relative to each other is effected by means of the bushing 5 of spring steel in section 2. This bushing with razor-sharp resilient lips 10 converges with a busiing 6 of bearing bronze disposed in the rotatable die section, and forms a bearing and seal therewith. If, in case of a very low viscosity of the material to be processed, some of the material should enter between the two bushings 5 and 6, ample opportunity exists for the material to discharge through the annular groove 8 in bushing 5 and the drain pipe 7. However, it was found in practice that, for example, when working with hard PVC, no leakage was detected even after a long operating period.

In the conventional blow molding arrangement, inlet 9 communicates between a plastics extruder flanged to section 2 and a blow molding mandrel disposed in section 1. The extruded plastic introduced thereby is forced around the mandrel which is supplied with pressurized air to form an extruded film. Typically, with this arrangement section 2 is rotated to provide a uniform film.

It is to be noted in connection with the present invention that small extrusion dies do not require any support in the front section 1. For heavy dies, advantageously adjustable rollers traveling in a circular ring are provided.

It is understood that the embodiment disclosed herein is susceptible to numerous changes and modifications, as will be apparent to a person skilled in the art. Accordingly, the present invention is not limited to the details shown and described herein but intended to cover any such changes and modifications within the scope of the invention.

I claim:

1. In a blow molding apparatus with an oscillating or rotating part and a fixed part for the production of tubular films from thermoplastic compositions in a horizontal mode of operation, the improvement comprising a seal formed between said oscillating or rotating part and said fixed part by a first bushing with unilaterally formed, razor-sharp lips disposed in the fixed part and a second bushing disposed in the rotating part, said seal being arranged in the zone of the axial material inlet, and said first bushing including an annular groove in communication with a discharge pipe.

2. In a molding apparatus according to claim 1, wherein siad first bushing is formed of spring steel.

3. In a molding apparatus according to claim 1 wherein said first and second bushings are, respectively, of spring steel and bearing bronze.

4. A blow molding apparatus for the production of tubular members from thermoplastic material in a horizontal mode of operation comprising a fixed die section and an oscillating die section, said die sections including an axial material feed bore for guiding material forming tubular members through the die sections, and a first bushing means fixedly secured to said fixed die section in said material feed bore and protruding into the material feed bore of said oscillating die section, said first bushing means including an annular groove in communication with a discharge pipe and being tubular-shaped with an outer surface forming a bearing surface with said oscillating die section and with a conical-shaped inner surface forming a seal with the bearing surface of said oscillating die section.

5. An apparatus according to claim 4, wherein a second bushing means is fixedly secured to said oscillating die section and forms a bearing surface between said first bushing means.

6. An apparatus according to claim 4, wherein said first bushing means is of spring steel.

7. An apparatus according to claim 5, wherein said first bushing means is of spring steel.

8. An apparatus according to claim 5, wherein said second bushing means is of bearing bronze.

9. An apparatus according to claim 7, wherein said second bushing means is of bearing bronze.

10. An apparatus according to claim 4, wherein the conical-shaped inner surface of said first bushing means converges to form resilient lips to form a seal with the bearing surface of said oscillating die section.

11. An apparatus according to claim 10, wherein said resilient lips are razor-sharp.

12. An apparatus according to claim 4, wherein said annular groove is provided at the outer surface of said first bushing means.

13. An apparatus according to claim 4, further comprising a plastics extruder flanged to said fixed die section and a blow molding mandrel disposed in said oscillating die section.

14. An apparatus according to claim 4, wherein the inner surface of said first bushing means is in communication with said material feed bore, whereby tubular members are guided by the inner surface of said first bushing means.

* * * * *